(12) United States Patent
Tai et al.

(10) Patent No.: US 10,579,506 B2
(45) Date of Patent: *Mar. 3, 2020

(54) REAL-TIME ANALYTICS OF MACHINE GENERATED INSTRUMENTATION DATA

(71) Applicant: International Business Machines Corporation, Armonk, NY (US)

(72) Inventors: Theresa Y. Tai, Poughkeepsie, NY (US); Elpida Tzortzatos, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/006,913

(22) Filed: Jun. 13, 2018

(65) Prior Publication Data

US 2018/0293153 A1 Oct. 11, 2018

Related U.S. Application Data

(63) Continuation of application No. 15/280,142, filed on Sep. 29, 2016, now Pat. No. 10,042,739.

(51) Int. Cl.
*G06F 11/36* (2006.01)
*H04L 29/08* (2006.01)
*G06F 16/28* (2019.01)

(52) U.S. Cl.
CPC ...... *G06F 11/3644* (2013.01); *G06F 11/3604* (2013.01); *G06F 16/283* (2019.01); *H04L 29/08072* (2013.01)

(58) Field of Classification Search
CPC ............. G06F 11/3644; G06F 11/3604; G06F 17/30592; H04L 29/08072
USPC .......... 717/130; 707/602, 603; 709/202, 203
See application file for complete search history.

(56) References Cited

U.S. PATENT DOCUMENTS

| 7,096,248 B2 | 8/2006 | Masters |
| 7,523,191 B1 * | 4/2009 | Thomas ............... G06F 11/3438 709/202 |
| 7,747,988 B2 | 6/2010 | Zhu |
| 9,195,829 B1 * | 11/2015 | Goradia .............. G06F 11/3608 |

(Continued)

OTHER PUBLICATIONS

Crawford et al., "Toward an on demand service-oriented architecture" (Year: 2005).*

(Continued)

*Primary Examiner* — Phillip H Nguyen
(74) *Attorney, Agent, or Firm* — Cantor Colburn LLP; William Kinnaman (57) ABSTRACT

An aspect includes generating instrumentation data for software that is executing on a computer and writing the instrumentation data to a memory located on the computer. An analytics application is provided with access to the instrumentation data. The writing the instrumentation data and the providing access are performed in real-time with respect to the generating. A request is received from the analytics application for at least a subset of the instrumentation data. Based on receiving the request, at least a subset of the instrumentation data is transmitted to the analytics application. A portion of the instrumentation data is migrated on a periodic basis to a non-volatile memory device that is external to the computer.

18 Claims, 4 Drawing Sheets

(56) References Cited

U.S. PATENT DOCUMENTS

| | | | |
|---|---|---|---|
| 2008/0148039 A1* | 6/2008 | Cobb | G06F 11/3612 |
| | | | 713/100 |
| 2010/0131945 A1 | 5/2010 | Zeort | |
| 2010/0251218 A1 | 9/2010 | Mahesh et al. | |
| 2011/0107307 A1* | 5/2011 | Liu | G06F 11/3664 |
| | | | 717/125 |
| 2014/0215058 A1* | 7/2014 | Vicat-Blanc | H04L 43/045 |
| | | | 709/224 |
| 2015/0007145 A1 | 1/2015 | Pierce | |
| 2015/0142842 A1 | 5/2015 | Baum et al. | |
| 2015/0205690 A1* | 7/2015 | Seto | G06F 11/008 |
| | | | 702/182 |
| 2015/0205691 A1* | 7/2015 | Seto | G06F 11/008 |
| | | | 702/182 |
| 2015/0222720 A1 | 8/2015 | Broda et al. | |
| 2015/0227847 A1 | 8/2015 | Noel et al. | |
| 2016/0078388 A1 | 3/2016 | Himmelreich et al. | |
| 2016/0224461 A1* | 8/2016 | Araya | G06F 11/3644 |
| 2017/0249200 A1* | 8/2017 | Mustafi | G06F 11/0709 |
| 2018/0052861 A1* | 2/2018 | Seetharaman | G06F 3/0482 |
| 2018/0089062 A1 | 3/2018 | Tai et al. | |

OTHER PUBLICATIONS

Anonymously; "Enhancing the expertise locator search operation within an enterprise through collection, aggregation and usage of employee status updates as a data source to locate experts in real time" IPCOM000239285D, Oct. 27, 2014, 4 pages.

Anonymously; "Method and System for Predicting a Need for and Provisioning of an Infrastructure, a Platform and Software in a Real-time", IPCOM000215230D, Feb. 22, 2012. 6 pages.

Rogers "ABCs of z/OZ System Programming vol. 11", 2010, 270 pages.

List of IBM Patents or Patent Applictions Treated As Related; (Appendix P), Filed Jun. 13, 2018, 2 pages.

* cited by examiner

REAL-TIME ANALYTICS OF MACHINE GENERATED INSTRUMENTATION DATA

DOMESTIC PRIORITY

This application is a continuation of U.S. patent application Ser. No. 15/280,142, filed Sep. 29, 2016, the content of which is incorporated by reference herein in its entirety.

BACKGROUND

The present invention relates generally to computer systems, and more specifically, to real-time analytics of machine generated instrumentation data.

System Management Facility (SMF) is a component of IBM's z/OS® for mainframe computers that provides a standardized method for writing out records of activity to a file, or dataset. SMF provides instrumentation of baseline activities running on an IBM mainframe operating system, including activities such as input/output (I/O), network activity, software usage, error conditions, and processor utilization. SMF forms the basis for many monitoring and automation utilities.

Apache Spark™ is an open source computing framework that provides programmers with an application programming interface (API) centered on a data structure called the resilient distributed dataset (RDD), a read-only multiset of data items distributed over a cluster of machines that is maintained in a fault-tolerant way. The availability of RDDs facilitates the implementation of both iterative algorithms that visit their dataset multiple times in a loop, and interactive/exploratory data analysis (i.e., the repeated database-style querying of data). Apache Spark is implemented using a cluster manager and a distributed storage system.

SUMMARY

Embodiments include a method, system, and computer program product for real-time analytics of machine generated instrumentation data. A method includes generating instrumentation data for software that is executing on a computer and writing the instrumentation data to a memory located on the computer. An analytics application is provided with access to the instrumentation data. The writing the instrumentation data and the providing access are performed in real-time with respect to the generating. A request is received from the analytics application for at least a subset of the instrumentation data. Based on receiving the request, at least a subset of the instrumentation data is transmitted to the analytics application. A portion of the instrumentation data is migrated on a periodic basis to a non-volatile memory device that is external to the computer.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments described herein provide an infrastructure to access machine generated instrumentation data in real-time as well as to provide for data aggregation across multiple machines in an enterprise. In accordance with one or more embodiments, machine generated instrumentation data is stored in real-memory of a computer where it can be directly streamed into an analytic framework such as, but not limited to, Apache Spark, DB2® Analytics Accelerator Loader from IBM, and a Hadoop engine. As used herein, the term "real-memory" refers to memory chips such as dynamic random access memory (DRAM) devices that are physically located on a computer and directly addressable by a processor of the computer. In accordance with one or more embodiments, instrumentation data that overflows the real-memory is offloaded to server attached flash memory devices. In one or more embodiments, where recently generated data is likely to be referenced more frequently, a time-based offloading algorithm can be utilized. Incorporating DRAM devices with server attached flash memory devices can provide a large memory capacity at great efficiency and optimal cost. In addition, storing overflow machine generated instrumentation data on flash memory devices can play to the strengths of flash technology since the instrumentation data is read only data.

In addition to utilizing a hybrid approach where in-memory buffers (stored in real-memory on the DRAM devices) and server attached flash memory devices are used for analyzing machine generated instrumentation data in real-time, one or more embodiments can also aggregate machine generated data across server machines in an enterprise data center. Machine generated instrumentation data from different servers can reside in the in-memory buffers on those servers without the need to stream the raw data to the server where the analytics is performed. In one or more embodiments, the analytics application server only needs to know what servers are participating and it sends requests to agents on those servers when the need arises based on specific queries or data aggregations. The agents on those servers retrieve the requested data from the in-memory buffers on the server and return only the data that is requested by the analytics application server for the specific query or data aggregation computation.

Embodiments described herein can allow an analytics application to have real-time access to machine generated instrumentation data and increase the speed at which data can be scanned. By reducing the time it takes to get from raw data to operational insight, enterprise reliability and availability can be improved.

Business's today can achieve great value by having the capability to analyze large volumes of data in real-time. Providing timely access to operational data can help organizations process machine generated instrumentation data more efficiently, thereby offering productivity gains that help keep pace with the influx of data. Embodiments described herein are contrasted with current approaches where the plethora of data that can be mined to diagnose errors that lead to outages, detect performance problems, and monitor system operational health are not leveraged in a real-time manner. The difficulty with leveraging machine generated instrumentation data in real-time in contemporary systems can be due to the lack of APIs and the lack of an infrastructure that allows timely access to the data, as well as the lack of support to aggregate this data across the entire enterprise. In contemporary systems, machine generated instrumentation data, such as SMF records, are written to disk (e.g., direct access storage device or "DASD" which requires the overhead associated with I/O operations to access the SMF records) and it could take, for example, up to twenty four hours before that data can be analyzed due to customers typically waiting to collect the data on disk for a certain time period before starting analysis.

As used herein, the term "real-time" refers to a level of computer responsiveness that a user senses as sufficiently immediate or that allows the computer to keep up with some external process. In one or more embodiments, instrumentation data is written to memory and made accessible to an analytics program in real-time, that is, as soon as the instrumentation data is generated, it is written to the memory and access to the instrumentation data is provided to the analytics application. As applied to embodiments described herein, real-time analytics are analytics that can be performed on the machine generated instrumentation data immediately after the instrumentation data is generated and written to the real-memory of the computer that generated the instrumentation data. In embodiments described herein, "immediately" refers to something occurring within a specified time frame such as a few milliseconds or microseconds. Embodiments described provide access to the machine instrumentation data immediately and do not require an I/O process to store and retrieve the data.

Figure 1:
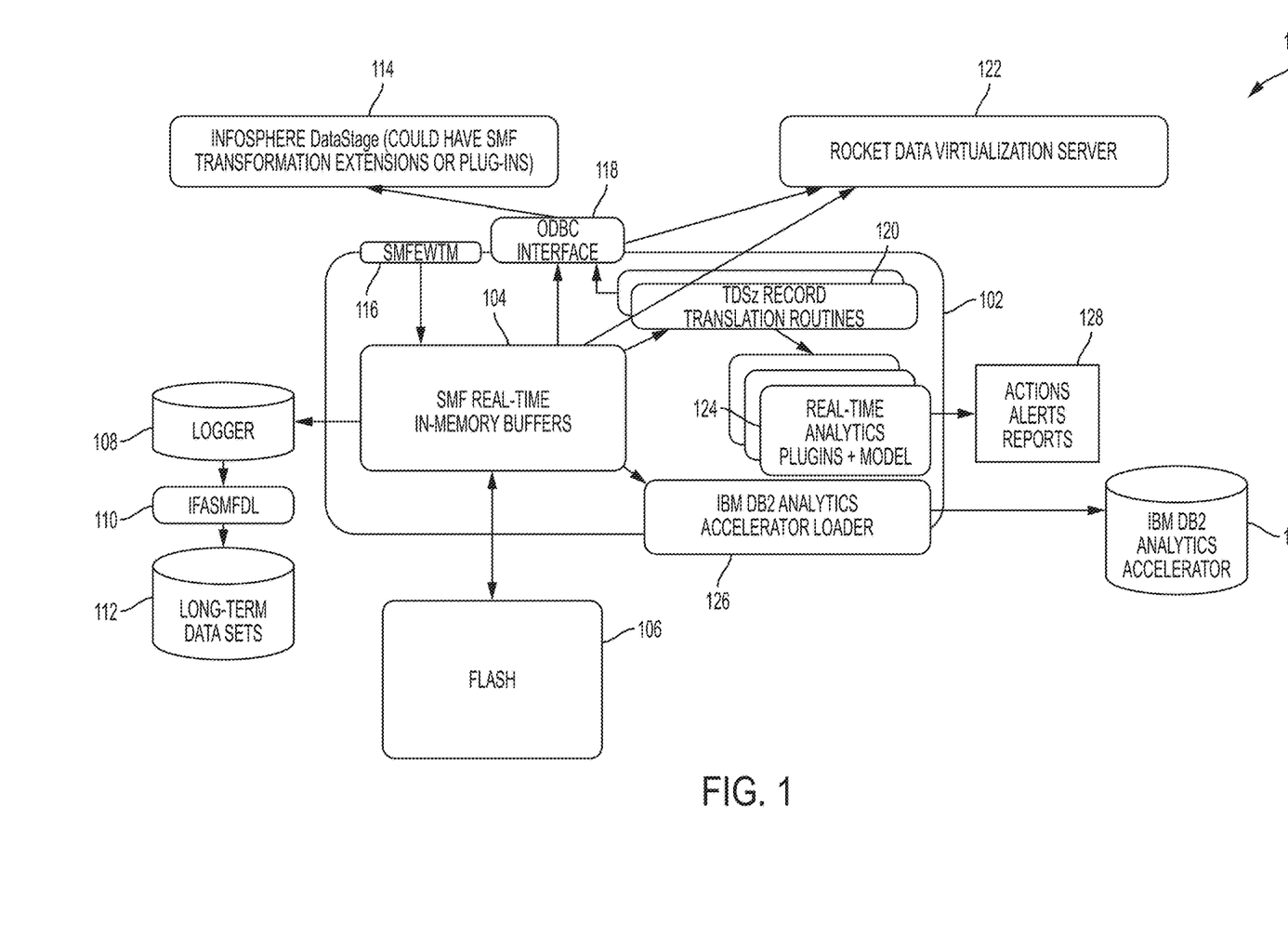
FIG. 1 illustrates a block diagram of components for real-time analytics of machine generated instrumentation data in accordance with one or more embodiments.

Turning now FIG. 1, a block diagram 100 of components for providing real-time analytics of machine generated instrumentation data is generally shown in accordance with one or more embodiments. The components shown in FIG. 1 include a processor 102 (also referred to herein as a "computer"), SMF real-time in-memory buffers 104 (e.g., 64-bit buffers located in real-memory) for storing SMF records, a flash memory device 106 for storing SMF records, a real-time analytics component 124 that can generate actions, alerts and/or reports 128 as output, and a SMF macro SMFEWTM 116 for directing what SMF records are collected for software executing on the processor 102. SMF records are an example of a type of instrumentation records that may be used for real-time analytics. Other types of instrumentation records can also be utilized such as, but not limited to: events, messages, logs, and device sensor data. In addition, the storage of the instrumentation data in real-memory is not limited to buffers of a specified size as other data structures and record sizes can be implemented by one or more other embodiments.

The components shown in FIG. 1 also include examples of interfaces that can be used to access data in the SMF real-time in-memory buffers 104 and flash memory device(s) 106 and products that can exploit these interfaces to obtain real-time access to the data. As shown in FIG. 1, a product such as InfoSphere® DataStage® 114 from IBM can be used to integrate data across multiple systems using a high performance parallel framework, and can be used to support extended metadata management and enterprise connectivity. The data being integrated can include big data at rest (e.g., Hadoop-based) or in motion (e.g., stream-based) on distributed and mainframe platforms. As shown in FIG. 1, a product such as Infosphere Datastage 114 can use open database connectivity (ODBC) style APIs 118 to get access to machine generated data from the in-memory buffers 104 in real-time. The data can then be processed instantly. A product such as z/OS System Logger 108 from IBM that includes a set of z/OS services can be utilized to allow an application to write, browse, and delete log data. z/OS System Logger services can also be used to merge data from multiple instances of an application, including merging data from different systems across a cluster of systems. Machine generated data including SMF or log data can be accessed from the in-memory real-time in-memory buffers 104 for immediate processing.

As shown in FIG. 1, the z/OS archive utility IFASMFDL 110 can be used to archive the data to a persistent medium such as long term datasets on disk 112 for audit and compliance purposes. In one or more embodiments, Tivoli® Decision Support for z/OS (TDSz) 120 can be used as a performance reporting tool for z/OS to track system performance and resource use, anticipate and solve problems, and plan for future resource needs. This information can be valuable in performance reporting, service level management, and accounting. In accordance with one or more embodiments, TDSz 120 can access the SMF real-time in-memory buffers 104 for instantaneous access to the data that needs to be analyzed for performance and resource utilization reporting. In one or more embodiments, this real-time machine generated data can also be loaded in real-time to a product such as the DB2 Analytics Accelerator 130 from IBM via, for example, the IBM DB2 Analytics Accelerator Loader 126 for optimized structured query language (SQL) query processing. In addition, in one or more embodiments, a product such as Rocket® Data Virtualization Server 122 can be used to access the SMF real-time in-memory buffers 104 to serve this data in real-time to applications that will do further analysis.

The embodiment shown in FIG. 1 includes buffers located in real-memory; SMF real-time in-memory buffers 104, with a server attached flash memory devices 106 to provide real-time access to machine generated instrumentation data. One or more embodiments, provide support for analytics applications (e.g., real-time analytics component 124) to mine the instrumentation data in real-time for monitoring operational health or for auto-tuning the system for performance. In one or more embodiments, SMF records are generated when a user attempts to access a file that the user does not have access to, and an output from the real-time analytics component 124 can include an alert to a manager of the user about the activity, an action that includes preventing the user from having access to an application, and/or a report on the user activity. Embodiments of the real-time analytics component 124 can also monitor how many files a user typically accesses in a specified time period and look for spikes in the number of files accessed, or other actions by a user that appear to be outside of past trends of the user. In response to detecting abnormal events, an alert can be sent in real-time to communicate the activity to a manager or supervisor. By having access to the instrumentation data in real-time, actions can be taken to prevent additional actions by the user. This is contrasted with contemporary systems where abnormal activity is reported after the fact. In accordance with one or more embodiments described herein, the abnormal activity can be reported as it is occurring and thus, can be prevented from continuing.

Figure 2:
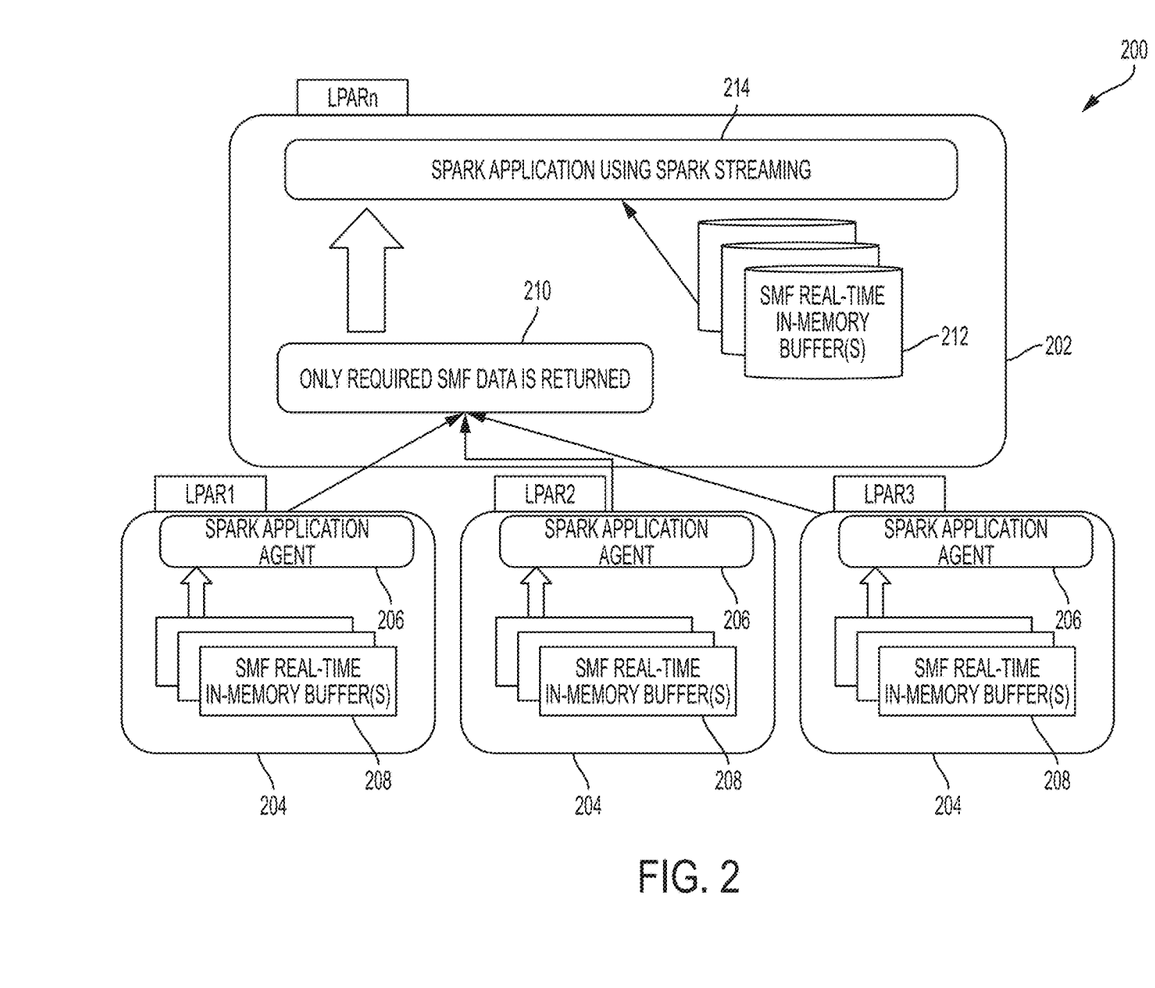
FIG. 2 illustrates a block diagram of components for aggregating machine generated instrumentation data in accordance with one or more embodiments.

Turning now to FIG. 2, a block diagram 200 of components for aggregating machine generated instrumentation data is generally shown in accordance with one or more embodiments. As shown in FIG. 2, embodiments of the analytics application can be implemented as a Spark application 214 executing on one processor 202 (shown as LPARn or "logical partition n") and a plurality of Spark application agents 206 executing on other processors 204. The processors 204 shown in FIG. 2 includes SMF records in SMF real-time in-memory buffers 208 with the contents created as described above with reference to FIG. 1, and a Spark application agent 206 of the Spark application 214 that has been provided access to the SMF real-time in-memory buffers 208. Each of the processors 202 204 can include all or a subset of the components shown in shown in FIG. 1. In addition, each of the processors 202 204 can be located on the same physical machine, or alternatively on different physical machines. As shown in FIG. 2, the Spark application 214 on processor 202 can request particular types of SMF records (e.g. for a particular software product(s), a particular user(s), a particular action(s), and/or a particular timeframe(s)) from each of the Spark application agents 206 executing on the processors 204. In response to the request, each of the Spark application agents 206 query the SMF records (in real-memory and/or in flash memory) and return the requested SMF data 210 to the Spark application 214. In one or more embodiments, the processor 202 executing the Spark application 214 is one of the processors being monitored and it collects data from its own SMF real-time in memory buffers 212 for aggregation with instrumentation data from the other processors 204. In one or more embodiments, the processor 202 executing the Spark application 214 only aggregates SMF records from other processors 204.

In one or more embodiments, when a request comes in to either aggregate, join or query the SMF data, the Spark application 214, using Spark streaming is aware of the data locality for SMF data that resides in the SMF real-time in memory buffers 208 of other systems/nodes in the spark cluster. The Spark application 214 using Spark streaming can leverage this data locality knowledge to forward the request to the Spark application agents 206 executing on other processors 204, and those other nodes will perform any necessary processing and filtering of the data on those nodes and only return the data that is needed to complete the request.

One or more embodiments described herein provide for aggregating and analyzing machine generated instrumentation data from servers across an enterprise data center without the need to consolidate the raw data on one server. Machine generated instrumentation data from other systems are provided to analytics applications only as needed/requested and only the sections of the data that is required to respond to the specific query is returned.

Figure 3:
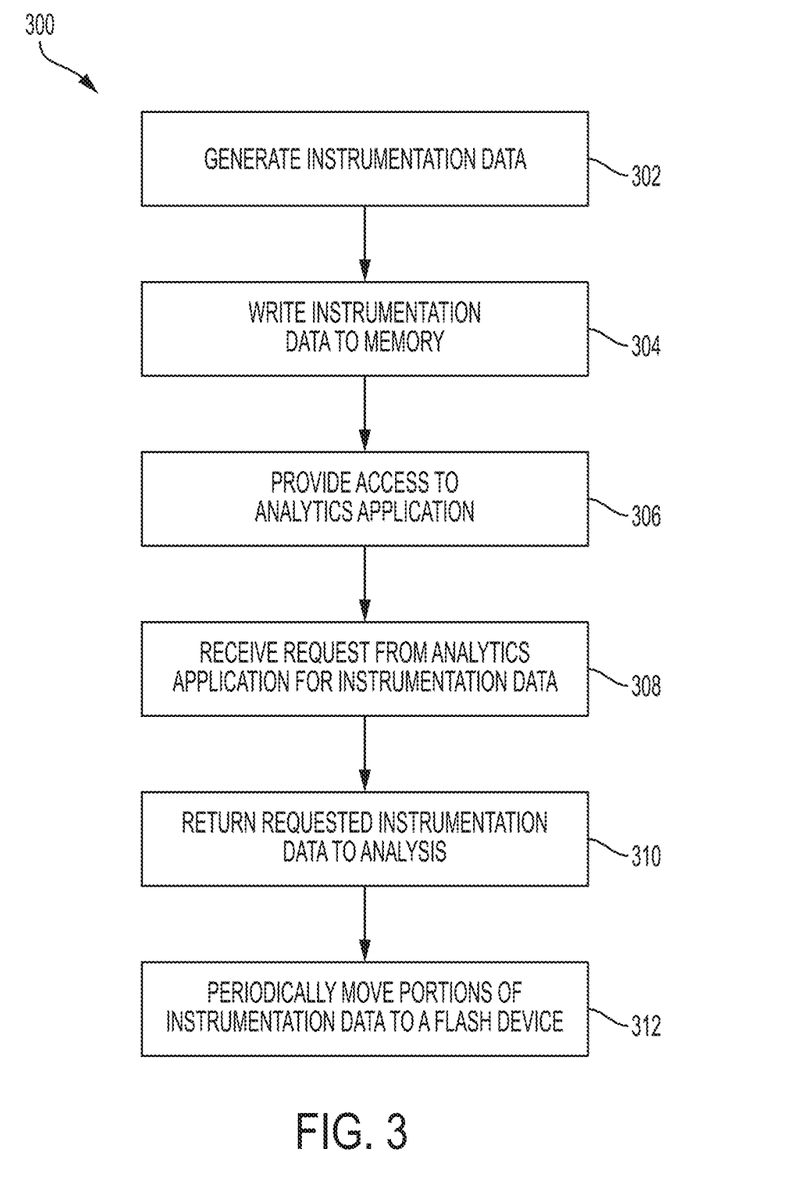
FIG. 3 illustrates a flow diagram for real-time analytics of machine generated instrumentation data in accordance with one or more embodiments.

Turning now to FIG. 3, a flow diagram 300 for real-time analytics of machine generated instrumentation data is generally shown in accordance with one or more embodiments. At block 302, instrumentation data (e.g., SMF records) are generated for software that is executing on a computer, and at block 304, the instrumentation data is written to memory. In one or more embodiments the memory is real-memory of the computer and implemented using a volatile RAM device located on the computer. At block 306, an analytics application is provided access to the instrumentation data. In one or more embodiments, access to the instrumentation data is via an agent of the analytics application that executes on the computer and responds to requests for data from the analytics application which may be executing on a different computer. In one or more embodiments, the writing and providing are performed in real-time with respect to the generating so that the instrumentation data is available to the analytics application immediately after it is generated.

At block 308, a request is received from the analytics application to access at least a subset of the instrumentation data, and at block 310, the requested data is transmitted to the analytics application. In accordance with one or more embodiments, at least a subset of the instrumentation data transmitted to the analytics application includes instrumentation data stored on a non-volatile memory device that contains overflow instrumentation data from the real-memory. As described previously, the analytics application transmits requests to a plurality of computers; consolidates the instrumentation data received from the plurality of computers; performs analysis based on the consolidated instrumentation data; and optionally recommends an action based on the analysis. In one or more embodiments, a recommended action is received at a computer form the analytics application and in response, the computer performs the recommended action.

At block 312, a portion of the implementation data is moved (or migrated) on a periodic basis to a non-volatile memory device (e.g., a flash memory device). The periodic basis can be based on timeframe or based on an amount of instrumentation data in the memory device. In one or more embodiments, instrumentation data that has not been accessed within a specified time period is migrated to the flash memory device. In one or more embodiments instrumentation data of selected record types or for selected software applications are migrated to the flash memory device. In one or more embodiments, the migration of instrumentation data is triggered by the real-memory having more than a specified number of SMF records or the real-memory having less than a specified amount of free space.

Figure 4:
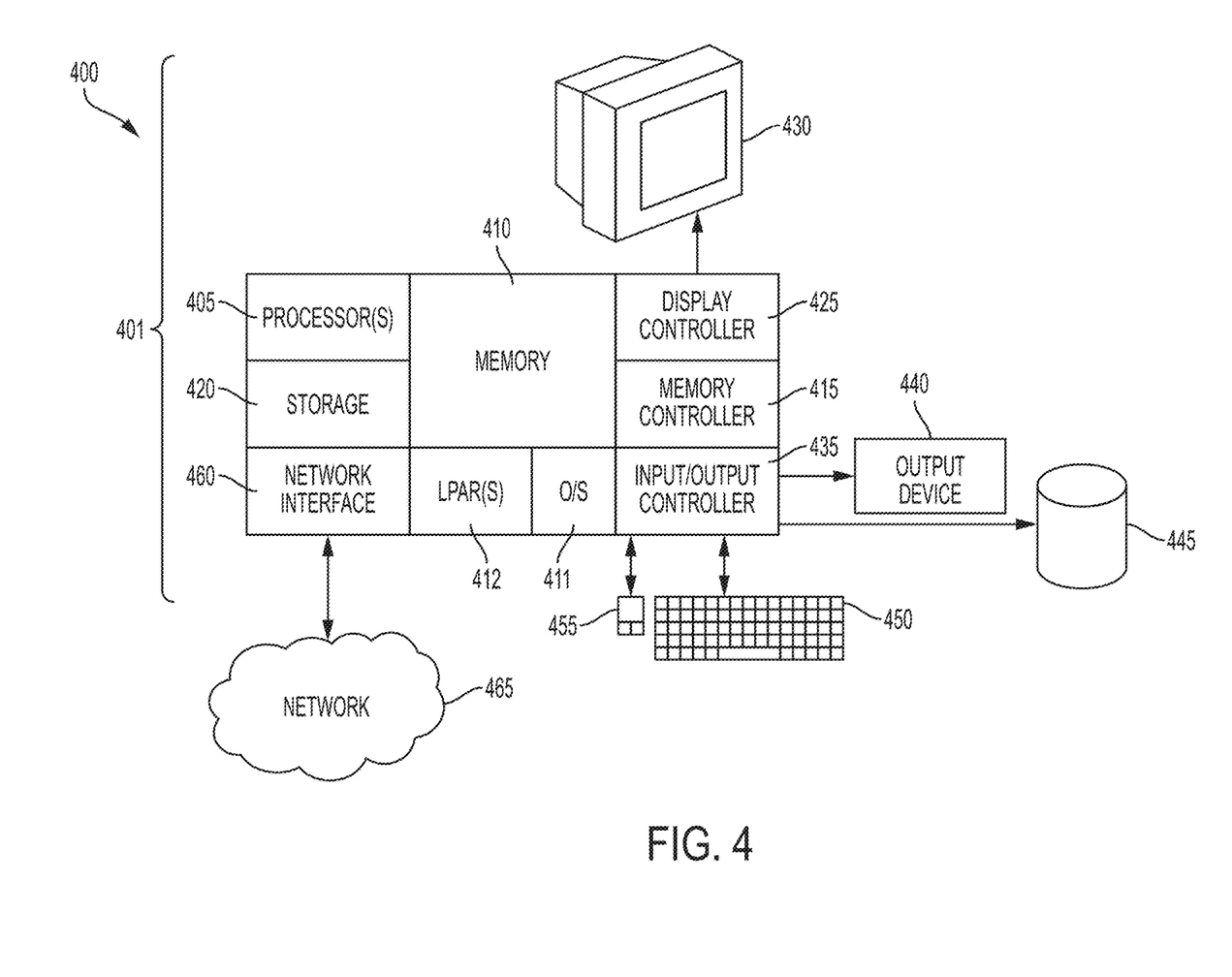
FIG. 4 illustrates a computer system for real-time analytics of machine generated instrumentation data in accordance with one or more embodiments.

Turning now to FIG. 4, a computer system for real-time analytics of machine generated instrumentation data is generally shown in accordance with one or more embodiments. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 400 therefore may include general-purpose computer or mainframe 401 capable of running multiple instances of an O/S simultaneously.

In an exemplary embodiment, in terms of hardware architecture, as shown in FIG. 4, the computer 401 includes one or more processors 405, memory 410 coupled to a memory controller 415, and one or more input and/or output (I/O) devices 440, 445 (or peripherals) that are communicatively coupled via a local input/output controller 435. The input/output controller 435 can be, for example but not limited to, one or more buses or other wired or wireless connections, as is known in the art. The input/output controller 435 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 435 may include a plurality of sub-channels configured to access the output devices 440 and 445. The sub-channels may include fiber-optic communications ports.

The processor 405 is a hardware device for executing software, particularly that stored in storage 420, such as cache storage, or memory 410. The processor 405 can be any custom made or commercially available processor, a central processing unit (CPU), an auxiliary processor among several processors associated with the computer 401, a semiconductor based microprocessor (in the form of a microchip or chip set), a macroprocessor, or generally any device for executing instructions.

The memory 410 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, and/or other types of storage media. Note that the memory 410 can have a distributed architecture, where various components are situated remote from one another, but can be accessed by the processor 405.

The instructions in memory 410 may include one or more separate programs, each of which comprises an ordered listing of executable instructions for implementing logical functions. In the example of FIG. 4, the instructions in the memory 410 a suitable operating system (OS) 411. The operating system 411 essentially controls the execution of other computer programs and provides scheduling, input-output control, file and data management, memory management, and communication control and related services.

The memory 410 may include multiple logical partitions (LPARs) 412, each running an instance of an operating system. The LPARs 412 may be managed by a hypervisor, which may be a program stored in memory 410 and executed by the processor 405.

In an exemplary embodiment, a conventional keyboard 450 and mouse 455 can be coupled to the input/output controller 435. Other output devices such as the I/O devices 440, 445 may include input devices, for example but not limited to a printer, a scanner, microphone, and the like. Finally, the I/O devices 440, 445 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 400 can further include a display controller 425 coupled to a display 430. In an exemplary embodiment, the system 400 can further include a network interface 460 for coupling to a network 465. The network 465 can be an IP-based network for communication between the computer 401 and any external server, client and the like via a broadband connection. The network 465 transmits and receives data between the computer 401 and external systems. In an exemplary embodiment, network 465 can be a managed IP network administered by a service provider. The network 465 may be implemented in a wireless fashion, e.g., using wireless protocols and technologies, such as WiFi, WiMax, etc. The network 465 can also be a packet-switched network such as a local area network, wide area network, metropolitan area network, Internet network, or other similar type of network environment. The network 465 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 401 is a PC, workstation, intelligent device or the like, the instructions in the memory 410 may further include a basic input output system (BIOS) (omitted for simplicity). The BIOS is a set of essential software routines that initialize and test hardware at startup, start the OS 411, and support the transfer of data among the hardware devices. The BIOS is stored in ROM so that the BIOS can be executed when the computer 401 is activated.

When the computer 401 is in operation, the processor 405 is configured to execute instructions stored within the memory 410, to communicate data to and from the memory 410, and to generally control operations of the computer 401 pursuant to the instructions.

In an exemplary embodiment, the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   generating instrumentation data for software that is executing on a computer, the instrumentation data comprising all or a subset of input/output (I/O) network activity, software usage, error conditions, and processor utilization, the generating based at least in part on output from a tool that monitors the software while it is executing on the computer;

writing the instrumentation data to a memory located on the computer;
providing an analytics application with access to the instrumentation data, the writing and providing performed in real-time with respect to the generating;
receiving a request from the analytics application for at least a subset of the instrumentation data;
based on receiving the request, continuously transmitting the at least a subset of the instrumentation data to the analytics application;
receiving a recommended action from the analytics application, the recommended action comprising one or both of sending a real-time alert and preventing a user from accessing at least a portion of the software; and
performing the recommended action at the computer.

2. The method of claim 1, wherein the access to the instrumentation data is via an agent of the analytics application executing on the computer, and the analytics application executes on a second computer.

3. The method of claim 1, wherein the instrumentation data are system management facility records.

4. The method of claim 1, wherein the memory is a random access memory device.

5. The method of claim 1, wherein the at least a subset of the instrumentation data includes data located on a non-volatile memory device that is external to the computer.

6. The method of claim 1, further comprising the analytics application transmitting requests to a plurality of computers, including the computer, consolidating the instrumentation data received from the plurality of computers, performing analysis based on the consolidated instrumentation data; and recommending an action to the computer based on the analysis.

7. A system comprising:
a memory having computer readable instructions; and
a processor for executing the computer readable instructions, the computer readable instructions including:
generating instrumentation data for software that is executing on a computer, the instrumentation data comprising all or a subset of input/output (I/O) network activity, software usage, error conditions, and processor utilization, the generating based at least in part on output from a tool that monitors the software while it is executing on the computer;
writing the instrumentation data to a memory on the computer;
providing an analytics application with access to the instrumentation data, the writing and providing performed in real-time with respect to the generating;
receiving a request from the analytics application for at least a subset of the instrumentation data; and
based on receiving the request, continuously transmitting the at least a subset of the instrumentation data to the analytics application;
receiving a recommended action from the analytics application, the recommended action comprising one or both of sending a real-time alert and preventing a user from accessing at least a portion of the software; and
performing the recommended action at the computer.

8. The system of claim 7, wherein the access to the instrumentation data is via an agent of the analytics application executing on the computer, and the analytics application executes on a second computer.

9. The system of claim 7, wherein the instrumentation data are system management facility records.

10. The system of claim 7, wherein the memory is a random access memory device.

11. The system of claim 7, wherein the at least a subset of the instrumentation data includes data located on a non-volatile memory device that is external to the computer.

12. The system of claim 7, wherein the computer readable instructions further include: the analytics application transmitting requests to a plurality of computers, including the computer, consolidating the instrumentation data received from the plurality of computers, performing analysis based on the consolidated instrumentation data; and recommending an action to the computer based on the analysis.

13. A computer program product comprising a computer readable storage medium having program instructions embodied therewith, the program instructions executable by processing circuitry to cause the processing circuitry to perform:
generating instrumentation data for software that is executing on a computer, the instrumentation data comprising all or a subset of input/output (I/O) network activity, software usage, error conditions, and processor utilization, the generating based at least in part on output from a tool that monitors the software while it is executing on the computer;
writing the instrumentation data to a memory located on the computer;
providing an analytics application with access to the instrumentation data, the writing and providing performed in real-time with respect to the generating;
receiving a request from the analytics application for at least a subset of the instrumentation data;
based on receiving the request, continuously transmitting the at least a subset of the instrumentation data to the analytics application;
receiving a recommended action from the analytics application, the recommended action comprising one or both of sending a real-time alert and preventing a user from accessing at least a portion of the software; and
performing the recommended action at the computer.

14. The computer program product of claim 13, wherein the access to the instrumentation data is via an agent of the analytics application executing on the computer, and the analytics application executes on a second computer.

15. The computer program product of claim 13, wherein the program instructions further include: the analytics application transmitting requests to a plurality of computers, including the computer, consolidating the instrumentation data received from the plurality of computers, performing analysis based on the consolidated instrumentation data; and recommending an action based on the analysis.

16. The computer program product of claim 13, wherein the instrumentation data are system management facility records.

17. The computer program product of claim 13, wherein the memory is a random access memory device.

18. The computer program product of claim 13, wherein the at least a subset of the instrumentation data includes data located on a non-volatile memory device that is external to the computer.

* * * * *